United States Patent [19]

Haines

[11] Patent Number: 5,014,555
[45] Date of Patent: May 14, 1991

[54] ROLL RATE SENSOR

[75] Inventor: Derrick J. Haines, Hatfield, United Kingdom

[73] Assignee: British Aerospace Public Limited Company, London, England

[21] Appl. No.: 253,257

[22] Filed: Oct. 4, 1988

[30] Foreign Application Priority Data

Oct. 5, 1987 [GB] United Kingdom ............... 8723324
Apr. 11, 1988 [GB] United Kingdom ............... 8808451

[51] Int. Cl.$^5$ ............................................. G01P 3/22
[52] U.S. Cl. ......................................... 73/518; 73/536
[58] Field of Search .......... 73/504, 536, 651, 517 AV, 73/517 R, 505, 518

[56] References Cited

U.S. PATENT DOCUMENTS 4,197,478 4/1980 Silvus, Jr. ..................... 73/517 R
4,222,272 9/1980 Mairson ........................ 73/510
4,479,385 10/1984 Koehler ...................... 73/517 AV
4,718,275 1/1988 Norling ..................... 73/517 AV X
4,848,158 7/1989 Edli et al. ....................... 73/518

Primary Examiner—John Chapman
Attorney, Agent, or Firm—Nixon & Vanderhye

[57] ABSTRACT

Disclosed is a roll rate sensor which may form part of a roll position sensor (an "up-sensor") and which comprises a vibratory element rotated by a motor within a projectile body so its rotation speed about the projectile axis is the sum of the motor speed and the projectile roll rate. The resultant centrifugal force acts on the element so as to vary its effective stiffness and hence its vibration frequency. A transducer is arranged to provide a signal corresponding to the vibration and hence to the centrifugal force and the roll rate. The vibratory element may comprise a metallic or silicon beam element.

10 Claims, 3 Drawing Sheets

ROLL RATE SENSOR

This invention relates to a sensor for sensing the roll rate of an item such as a spinning projectile. The sensor may form part of a reference direction sensor, i.e. a so-called 'up-sensor', which provides information for use on board the item regarding its roll position in space.

A number of proposals for sensing roll position of a projectile are known. For example, it has been proposed by various means such as pendulums and radially mounted accelerometers to sense the direction of the Earth's gravitational pull. None of the prior proposals are useful in every situation and also some of them suffer the problem of being rather complex and expensive.

Thus an objective of the invention is to provide a roll rate sensor which may be useful in situations for which the prior proposals are not useful and further which is relatively economical in manufacture.

According to the invention, there is provided a roll rate sensor comprising:

support means and a mass coupled to the support means by way of a resiliently deformable element for the mass and support element to rotate with the support means, for the mass to be deflected relative to the support means in response to centrifugal force during such rotation, for the mass to vibrate resonantly at a frequency determined by the stiffness of the resiliently deformable element, and for the said stiffness to vary with said deflection of mass, and transducer means for forming a roll rate signal representative of said frequency.

One embodiment of the invention to be described includes a dummy resiliently deformable element and attached mass for counterbalancing the active element and mass. The resiliently deformable element may comprise a vibratory beam and its stiffness may be caused to vary with deflection of the mass by providing a curved support surface adjacent the beam so that, as the mass deflects, the beam comes into progressively increasing contact with the surface which leaves a progressively decreasing free length of the beam. Advantageously, the curved support surface comprises a flexed secondary beam.

By way of an alternative, there may be used as the resiliently deformable element a flexible beam of which the resonant frequency varies with beam deflection by incorporating a pre-strained tie-bar or strut support.

For a better understanding of the invention and to show how the same may be carried into effect reference will be made, by way of example, to the accompanying drawings, in which.

Figure 1:
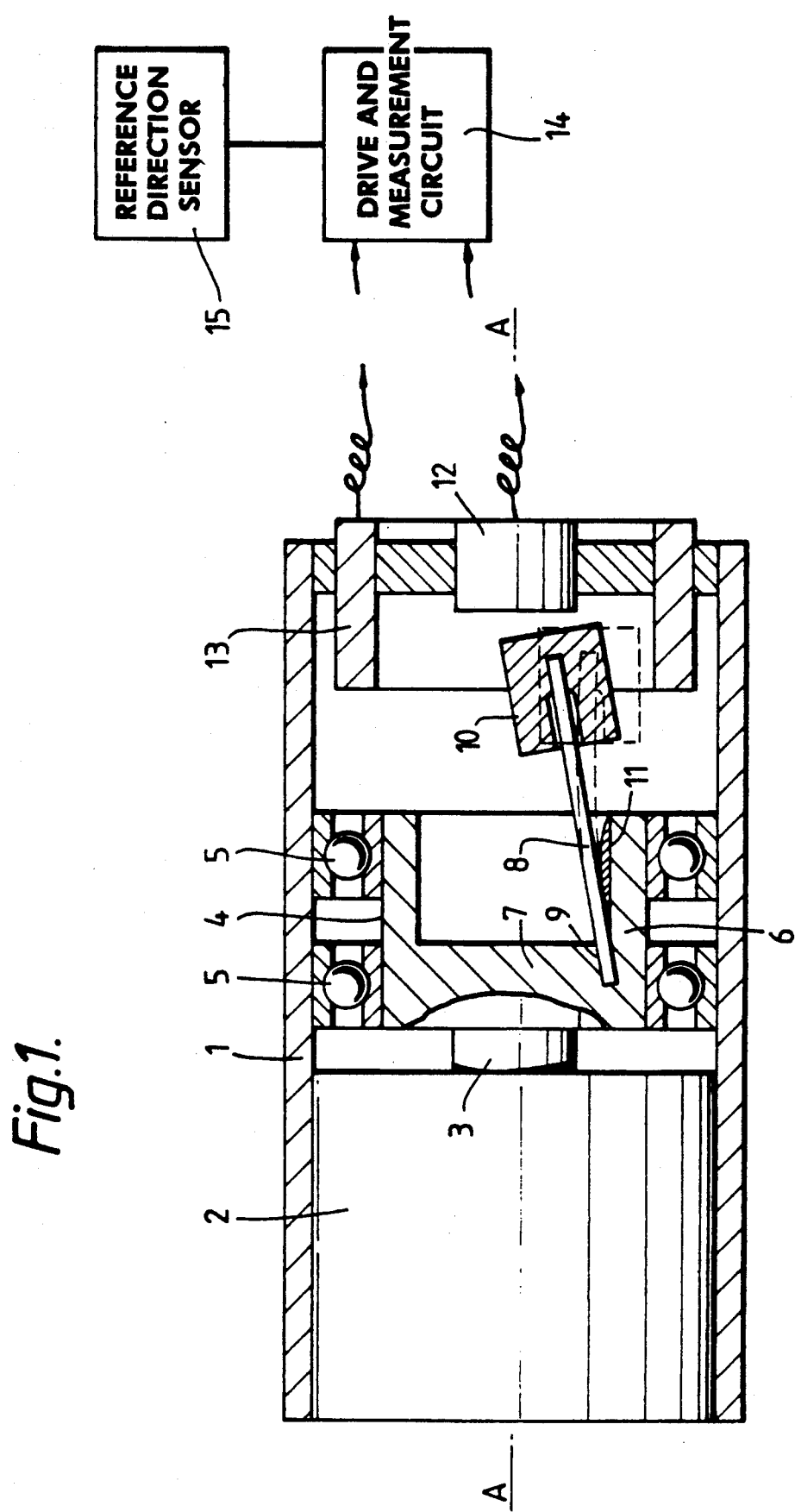
FIG. 1 is a partly sectioned diagrammatic view of a roll rate and reference direction sensor.

FIG. 1 shows a cylindrical housing 1 fixed in a projectile (not shown) with its axis AA aligned with the roll axis of the projectile body. An electrical motor 2 is fixed in the housing and the output shaft 3 of the motor is coupled to a cup shaped member 4 which is supported for rotation about axis AA by bearings 5 and of which the mouth faces away from the motor. During operation, motor 2 is driven so that the cup shaped member 4 rotates about axis AA at a mean rate $(W+Wr)$ where $W$ is the rate of rotation of the member relative to the projectile while $Wr$ is the roll rate of the projectile. To one side of the interior of the cup shaped member, at the corner where its wall 6 meets its base 7, there is fixed one end of an elongate spring leaf 8, for example by having this one end engaged in a small slot shaped hole 9 formed here. The leaf 8 extends, with a shallow inward inclination relative to axis AA, along and then beyond wall 6 so that its other or outer end, to which there is fixed a mass 10, lies outside of the cup shaped member and, at least initially, is nearer to axis AA than the fixed inner end of the leaf while still being spaced from that axis. The thickness of the leaf, i.e. its thinnest dimension, is in the direction generally radial to axis AA. Fixed to the end of the housing near mass 10 is a capacitor formed by an outer cylindrical electrode 13 and an inner or central electrode 12. The mass 10 extends to within the space inside electrode 13 and adjacent electrode 12 so as to form, with the plates 12 and 13, a capacitive transducer through which energy can be imparted to the mass 10 to induce it to vibrate resonantly through a small amplitude back and forth radially with respect to axis AA and which also generates a signal indicative of that vibration. The drive energy is supplied and the vibration indicative signal is received by a drive and measuring circuit 14. Meanwhile, in response to centrifugal force generated as the mass 10 rotates with member 4 about axis AA, the leaf is able to deflect outwards from the axis as shown by the dashed outline in the figure, the degree of deflection being dependent upon the rate of the rotation.

The width of the spring leaf is substantially greater than its thickness so that the mass 10 tends to always vibrate and deflect in planes containing axis AA.

Fixed to the inside surface of wall 6, between this wall and the leaf 8, is a member 11 which presents to the leaf 8 a convexly curved surface so that, as the mass 10 deflects outwards due to centrifugal force, more and more of the length of the spring leaf comes into contact with this surface leaving a progressively shorter free length of the leaf. As a result, the greater the rotation rate and centrifugal force, the greater becomes the small amplitude resonant vibration frequency of the mass 10. Thus the frequency of the signal fed out to the circuit 14 is indicative of the rotation rate. Using an initial or periodically supplied reference direction datum signal from some suitable sensor 15, the circuit 14 can integrate the rate signal supplied by the capacitance transducer to produce a continuously updated roll position signal. By way of example, if during its flight the projectile goes through a short ballistic phase, the sensor 15 could comprise a rate sensor which becomes active during this phase to sense the ballistic plane, this then being used as the datum for use by circuit 14 during subsequent flight phases.

In addition to the capacitive transducer formed by electrodes 12 and 13, an inductive transducer (not shown) could be provided in the housing 1, the capacitive transducer being used to form the rotation rate indicative signal and the inductive transducer being used to impulse the mass 10 and maintain it vibrating.

Alternatively, the capacitive transducer could be discarded and a suitable inductive transducer alone could carry out both functions.

One or more abutments (not shown) could be provided in housing 1, perhaps fixed to the member 4, to prevent the mass 10 from deflecting through too large an amount radially with respect to axis AA and/or laterally in response to any shock and over-range forces experienced by the device.

It is preferable but not essential that the axis AA should be coincident with the roll axis of the projectile body. An offset between these two axes will result in a cyclic variation of the roll rate signal which could be allowed for in the circuit 14. Similarly, though preferred, it is not essential that axis AA should be precisely parallel to the projectile roll axis.

As will be appreciated, it is preferable that the rate indicative signal should not be influenced too greatly by fore and aft acceleration, pitch and yaw rotation, or lateral acceleration of the projectile. To reduce the effect of fore and aft acceleration, it is preferred that the inclination of the spring leaf 8 with respect to the fore and aft projectile axis (axis AA in this case) should be comparatively small throughout its working range of movement radial to axis AA. To reduce the effect of pitch and yaw rotation and lateral acceleration, it is preferred that the speed of motor 2, i.e. the rotation rate W of the cup shaped member and the spring leaf relative to the projectile body, should be substantially greater than the expected maximum roll rate of the projectile. This is because, owing to the rotation of the spring leaf, any pitch and yaw rotation and lateral acceleration induced forces acting thereon will be alternatively negative and positive with $(W+Wr)/Wr$ cycles per revolution of the projectile. Thus, if $(W+Wr)$ is much greater than $Wr$, the error within the time $(W+Wr)/2\Pi$ of any one cycle will be comparatively small. Meanwhile, of course, due to its cyclic nature, the cumulative error over several cycles will be zero.

It is in any case preferred that W should be much greater than Wr because of the good effect this has on the linearity of the sensor as will be shown subsequently herein.

Figures 2, 3:
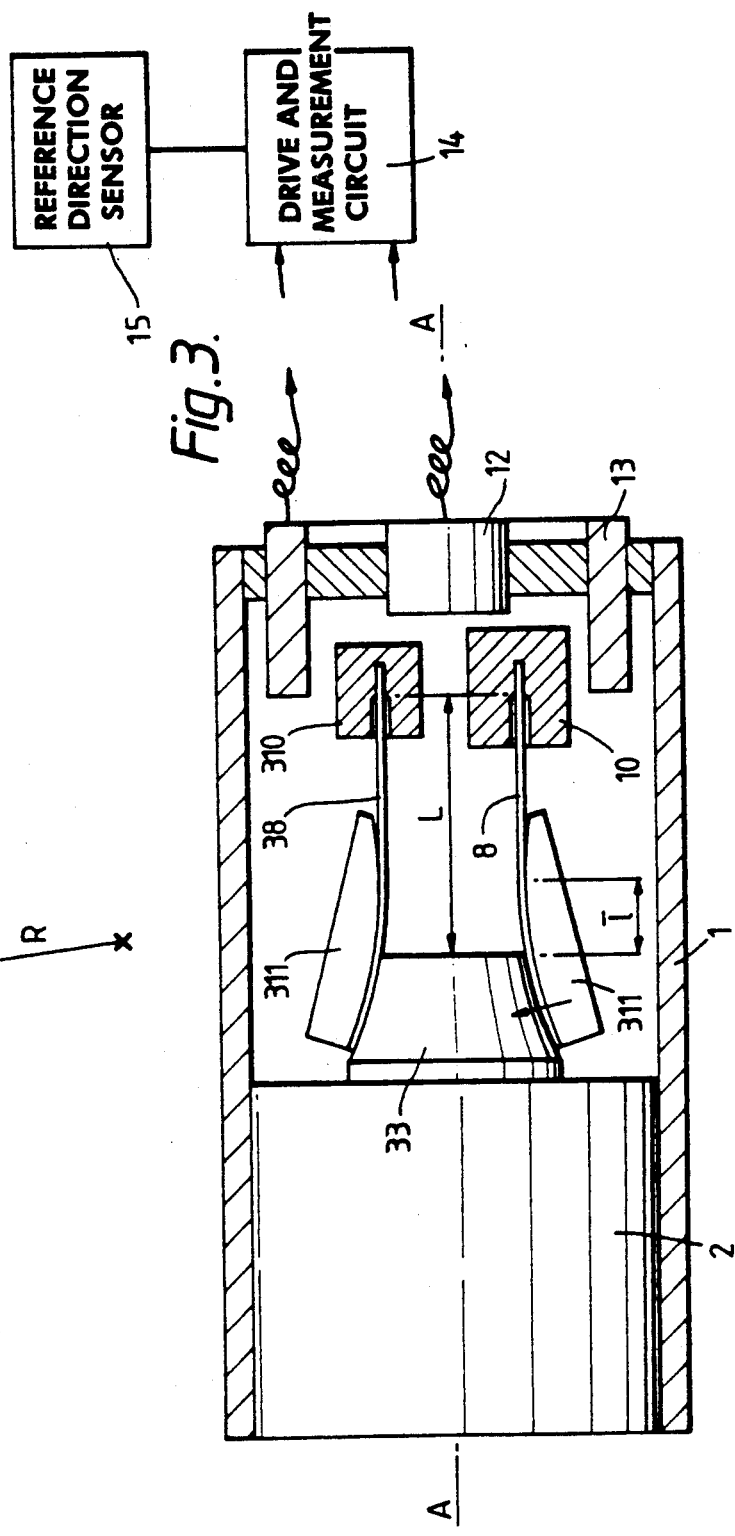
FIG. 2 is a diagram for explaining the behaviour of the sensor in operation.
FIG. 3 is a partly sectioned diagrammatic view of another roll rate and reference direction sensor.

FIG. 2 shows part of the member 4, the curved surface defining member 11, the spring leaf 8 and the mass 10 all rotating about axis AA at a mean rate $W+Wr$ so that, in response to centrifugal force, the mass 10 is deflected away from axis AA to bring a part of the spring leaf 8 into contact with the surface of member 11. This surface is a simple circular arc of radius R while the cross-section of leaf 8 is constant throughout its length. The initial, undeflected positions of leaf 8 and mass 10 are shown by the dashed outline. The leaf, from the point where it emerges from fixing hole 9 to where it is attached to mass 10, has a length L and an initial portion X of this length has come into contact with member 11. The mass 10 has a mass value M and is at distance D from axis AA. From this position, a further incremental movement y of the mass takes place along a direction perpendicular to line BB at angle $\phi$ to axis AA.

The force applied to the surface of member 11 at any position along the initial portion X of the spring leaf is counterbalanced by an equal and opposite reaction force applied by the surface to the spring leaf.

The reaction force f per unit length of the leaf, at a distance x from the hole 9 (where x is equal to or less than X) can be expressed as a power series of the form:

$$f = f_1 x/X + f_2 x^2/X^2 \ldots + f_n x^n/X^n$$

where $f_1, f_2 \ldots f_n$ are coefficients defined by the system geometry including the radius R and the force F exerted by the mass 10 on the spring leaf.

The terms of the series with orders greater than $x^2$ have only a small net effect on f and will be disregarded in the following. However, it will be appreciated that when designing a sensor in accordance with the invention, some of them (the $x^3$ and $x^4$ terms for example) can be included if desired.

Since the surface of member 11 is a circular arc of radius R, then the initial portion of the spring leaf from $x=0$ to $x=X$ is also a circular arc of radius R. Thus, using standard beam deflection theory, for a case where X is equal to or less than 0.5L, it can be shown that:

$$f_1 = f_2(X/3 - 5L/48 - X^2/4L)/(X^2/3L - X/2)$$

that:

$$f_2 L = 6F_{0.5}/(1 - 4x^3/10L^3)$$

and that:

$$R = 1.6522 EI/LF_{0.5}$$

Where
  E is Youngs Modulus for the leaf
  I is the second moment of area of the leaf
  $F_{0.5}$ is the force exerted by the mass on the leaf when the leaf is supported by the surface member 11 along half the length of the leaf, i.e. when $X/L=0.5$.

It will be appreciated that if X may have some other maximum value, X is equal to or less than 0.4L say, then the equations above will take different forms, all however being obtainable by the application of standard beam deflection theory and well within the capability of those skilled in the art.

In addition, again applying standard mathematics, the total movement Y, due to centrifugal force experienced by the mass 10, is given by:

$$Y = [F(L-X)^3/3 + F_{0.5}L(0.60525LX - 0.30263X^2) - ]/EI$$

where $$F = 0.60525 F_{0.5} + f_1 X^2/3L + f_2 X^2/4L$$

Hence, for a prescribed centrifugal force F the effective mean stiffness of the assembly $(F/Y)$ can be calculated and, when subjected to this force, the incremental stiffness $(K = dF/dY)$ can also be calculated.

Now, for equilibrium of the mass:

$$My + Ky = M(D \cos \phi + y \cos^2 \phi)(W + Wr)^2$$

where, as noted earlier, y is a further incremental movement of the mass 10 in the direction perpendicular to line BB. This further movement is due to the resonant vibration of the mass about the average position shown in FIG. 2 and, applying the mathematics of harmonic motion, the above expression becomes the following differential equation, i.e.

$$y[MW_{res}^2 + M(W+Wr)^2 \cos^2\phi - K] = MD(W+Wr)^2 \cos\phi$$

where $W_{res}$ is the frequency of the resonant vibration.

The resonance condition is defined by the Complementary Function of the solved differential equation, i.e.

$$W_{res}^2 = (K/M) - (W + Wr)^2 \cos^2\phi$$

It will be appreciated that, for the above to yield a real solution, K/M should be greater than $(W+Wr)^2 \cos^2\phi$ (which implies that the spring leaf should have a relatively high stiffness).

The detailed design of some particular example of a sensor as proposed herein can include an iterative process in which different values of parameters are used in the formulae given above, including the aforementioned different forms applicable for different maximum values of X, until the optimum values for that example are achieved. Naturally, the use of a computer in this process would be of assistance and it is believed that those skilled in the art are readily capable of incorporating such formulae into a suitable computer program and using it to achieve an optimum design for any particular application. However, by way of example only, in a sensor as shown in FIG. 1, the spring leaf 8 may be made of precipitation hardened berylium copper and have a length L of 0.75", a width b of 0.141" and a thickness d of 0.042", while the mass 10 is 7.5 gms, the distance between the mass and axis AA when the leaf is undeflected is 0.124", the surface of member 11 is circularly curved with a radius R of 3.185", and the speed of motor 2, i.e. W/2II, is 175 rps.

Mathematical analysis of the above example shows that, over a range of roll rates of the projectile, say from 10 to 15 rps, a plot (not shown) of mean centrifugal force acting on mass 10 versus roll rate is almost exactly a straight line.

The circuit 14 may incorporate a simple counter arranged to count cycles of the signal received from the sensor minus twice the rotation rate of the motor 2, i.e. to count $W_{res}/2II - W/II$ so that the content of the counter increases by ten for each revolution of the projectile and, over the given range of roll rates, the largest cumulative error in the roll position indication will be within a bandwidth of ±17° per second of recording time. This could be improved by further optimisation of the design and/or by trimming the built sensor, e.g. by trimming the mass 10 using laser beam machining apparatus.

Remembering the expression $W_{res}^2 = (K/M) - (W + Wr)^2 \cos^2\phi$ it will be appreciated that if (K/M) is proportional to (W + Wr). In developments (not shown) of the described and illustrated sensor, this is done by either or both of giving the spring leaf 8 a cross-sectional shape which is not constant throughout its length and making the surface of member 11 a complex curve rather than a simple circular arc.

In the embodiment of the sensor shown in FIG. 3, there is again provided a cylindrical housing 1 with a motor 2 arranged so that the axes AA or the motor shaft and of the housing are aligned with the roll axis of the projectile (not shown). In place of the cup-shaped member 4 of FIG. 1, however, the motor 2 is provided with a relatively large diameter shaft 33 which has a curved inwards taper in the direction towards its end, i.e. away from the motor. The fixed end of the leaf spring 8, along with a fixed end of a second leaf spring 38 which is positioned diammetrically opposite spring 8, are clamped against the tapered part of the shaft 33 by respective profile defining members 311 which in turn are fixed to the shaft, say by screws (not shown). Instead of the two members 311, there could be provided a clamp ring (not shown) which is such that in sectional elevation, at least the inner surfaces of its wall has the same shape as the surfaces of the members 311, i.e. so it is exactly equivalent to members 311 but simply extends right around the end of the shaft. At the free end of the leaf spring 38 is fixed a mass 310 which has the function simply of balancing the structure. Items 12, 13, 14 and 15 in FIG. 3 are identical in construction and function to the like numbered elements of FIG. 1.

In either of the illustrated embodiments, the mass 10 and spring leaf 8 could be replaced by a silicon chip which has been chemically etched to define a vibratory beam thereon, i.e. so that the beam is made of silicon, which, by virtue of having a support surface formed adjacent the beam (i.e. so as to act in the same way as the support formed by member 11 in FIG. 1 or members 311 in FIG. 3) or by virtue of being so shaped that its stiffness changes in any case with deflection of the beam, vibrates at a resonant frequency dependent upon the centrifugal force applied to it.

By way of example only, in a sensor as shown in FIG. 1 or FIG. 3, the spring leaf 8 may be made of silicon cut from a single crystal wafer such that the beam width, b, and the beam axis lie in the 011 plane of the crystal and have a length L of 0.70", a width b of 0.125" and a thickness d of 0.0171", while the mass 10 is 0.1277 gms, the distance between the mass centre and axis AA when the leaf is undeflected is 0.276" and the speed of motor 2, i.e. $W/_{2II}$, is 175 rps. In this example member 11 is also made of silicon and its surface is circularly curved with a radius R of 9.216".

As in the berylium copper outline example mathematical analysis of this silicon embodiment example shows that, over a range of roll rates of the projectile, say from 10 to 15 rps, a plot (not shown) of mean centrifugal force acting on mass 10 versus roll rate is almost exactly a straight line. Also, as in the previous example a simple relationship can be postulated, as indicated in FIG. 4, which allows the variables to be adequately collated.

Figure 4:
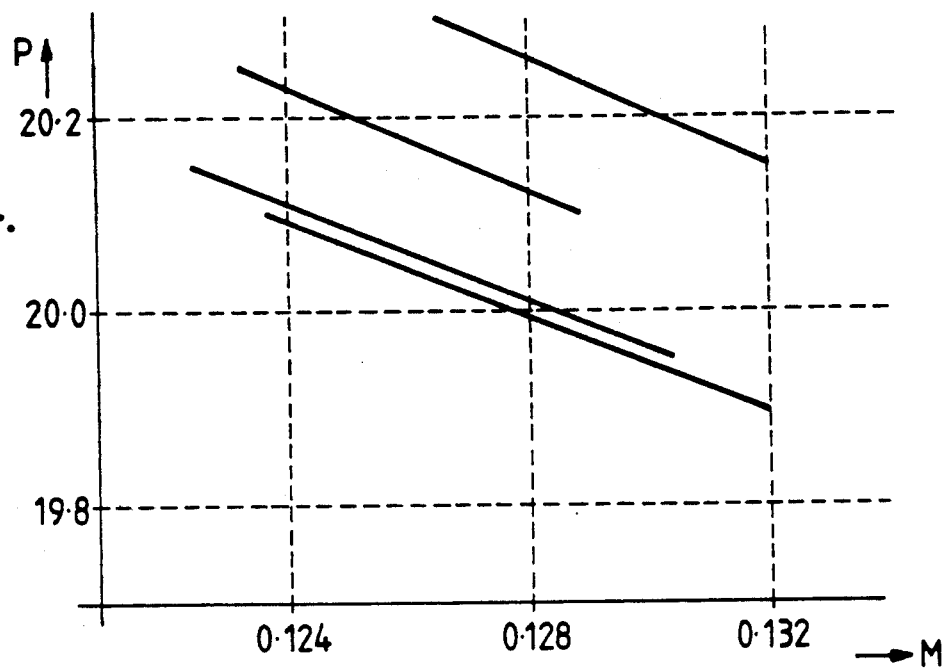
FIG. 4 is a diagram for assisting in the design of a sensor.

FIG. 4 comprises four line plots A, B, C and D showing, for respective different values of L and w/2II, the relationship between the value M in grammes of the mass 10 and the value of a coefficient P which is defined by the equation:

$$W_r = W_{res}/P - (1 - 15/P)W$$

Ideally, each roll rate sensor is trimmed and adjusted so that P becomes an integer whereupon there is achieved a simple integer relationship between $W_{res}$ on the one hand and the combination of W and $W_r$ on the other. For example, if P=20, a counter recording two events per resonance cycle minus ten events per revolution of the drive motor will give forty indications of position per missile roll cycle, i.e. it will give a position update every 9° of missille roll.

For FIG. 4, it is assumed that some structural parameters are as given in the silicon beam example mentioned above, i.e. the beam is cut from a single crystal wafer such that its direction, i.e. its width dimension and its axis lay in the 011 plane of the crystal. Meanwhile, Young's Modulus E for the beam is $1.7 \times 10^{12}$ Dynes/cm², the maximum bending stress is $1.38 \times 10^9$ Dynes/cm²(20,000 lbs/inch²) and, as in the example, d=0.171 inches, b=0.125 inches and L=0.7 inches.

Plot A is for a case where L=0.3 inches, W/2II=175 cycles per second and, when 1/L=0.5, $(W+W_r)/2II=192.5$ cycles per second.

For Plot B, L=0.325 inches, W/2II=170 cycles per second and, when 1/L=0.5, $(W+W_r)/2II=190$ cycles per second.

For Plot C, L=0.3 inches, W/2II=175 cycles per second and, when 1/L=0.5, $(W+W_r)/2II=195$ cycles per second.

Finally, for Plot D, L=0.325 inches, W/2II=175 cycles per second and, when 1/L=0.5, $(W+W_r)/2II=195$ cycles per second.

Again the circuit 14 may incorporate a simple counter arranged to count, in this example, cycles of the signal received from the sensor at a rate of two per cycle, minus ten times the rotation rate of the motor 2, i.e. to count $W_{res}-5\times W$, so that the content of the counter increases by forty for each revolution of the projectile and, over the given range of roll rates, the cumulative error in the roll position indication will then be zero at 15 rps rising to 12° per second of recording time at 12.5 rps and rising to 35° per second of recording time at 10 rps. As stated previously, by shaping the curved beam, and/or shaping the curved support structure these error figures can be reduced to a small fraction of the cumulative values here listed.

A particular merit of ceramic silicon as the beam and support medium is its low change of Youngs Modulus with temperature, i.e. 30 parts per million per °C., and its low coefficient of expansion, i.e. 4.2 parts per million per °C., hence in this silicon embodiment example the cumulative error in roll rate per second of recording time is of order one degree per 10° C. of temperature change.

Finally, in terms of the precision accuracy which should be attainable using ceramic silicon as a build material it becomes important that the speed of motor 2 is kept as near constant as possible. In the silicon embodiment example now described a cumulative error in roll rate of +6.8 degrees per second of recording time results from a change of −0.05 rps in the motor speed of 175 rps. However, if during the recording time the motor speed averages 175 rps then the nett cumulative error due to this effect is reduced to a very small value.

Figure 5:
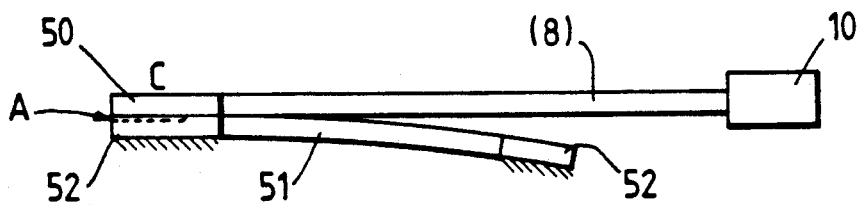
FIGS. 5 and 6 are respectively an elevation and a plan view of part of a modification of the previously illustrated sensors.
Figure 6:
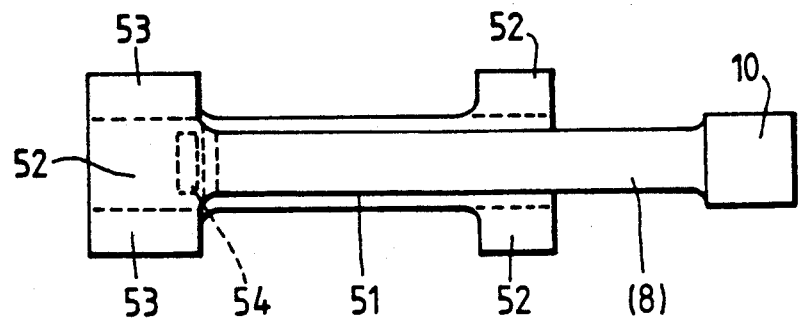

The profiles of the inwardly directed surfaces of the members 11 and 311 have to be machined to quite a high degree of accuracy. Meanwhile, as may be known, a uniform beam subjected to a simple perfect bending couple assumes a perfect circulatory curved shape. Thus, to ease any manufacturing problems occasioned by the desirable degree of accuracy of members 11 and 311, each of these members could be replaced by a pre-flexed secondary beam as shown in FIGS. 5 and 6. Here, a vibratory beam 8 and integral mass 10 are cut from a silicon wafer as described earlier, the inner or fixed end of the beam being widened out to define a fixture land 50. A secondary beam 51 having fixture lands 52 at its two ends is also cut from a silicon wafer. With the beam 51 extending along beneath the beam 8, the land 50 and one of the lands 52 are fused together in zones 53 towards the two sides of each land and also in the zone 54 just where the free length of the beam 8 is to start, this zone 54 being carefully positioned so as to achieve the desired free length. The composite beam is then fixed to an appropriate support sub-structure (not shown) which is in turn mounted to a rotary member (not shown), for example an appropriately adapted version of the cup-shaped member 4 or shaft 33, by fusing or bonding appropriate faces of the fixture lands 50 and/or 52 to the sub-structure, the secondary beam meanwhile being flexed so that it takes up it perfect curved shape and is then retained in that shape by the fixing of its two ends.

As mentioned earlier, it may be preferred for the profile of the members 11 and 311 not to comprise a uniformly circular curve. This can be achieved in relation to the use of the secondary beam of FIGS. 5 and 6 by making the secondary beam with a cross-sectional shape which is not constant throughout its flexure length, i.e. so that when it is flexed and its two ends fixed, it will assume a non-uniformly curved shape. Alternatively, the secondary beam could remain uniformly shaped but, instead of applying a simple 'perfect' bending couple to it, some more complex flexing load could be applied.

As noted previously, particularly in the case of silicon, it may be possible to arrange for the stiffness of beam 8 to change with its deflection without having it come into progressively greater contact with a profiled support surface such as members 11 and 311 or secondary beam 51. By way of example, an appropriate piece of silicon can be etched so as to form a structure (not shown) which incorporates a vibratory beam and mass and, in addition, an offset or inclined support strut or tie-bar coupled to the beam and pre-strained so as to make the vibration frequency of the structure as a whole dependent upon the deflection amplitude of the beam and mass.

At present at least, the earlier described arrangements, i.e. those using a support surface such as members 11 and 311 or secondary beam 51, are preferred because they may offer a greater amplitude of vibration frequency variation for a given degree of deflection taking into account the resistance to in-use fracture of the beam.

What is claimed is:

1. A roll rate sensor comprising:
   a rotatable support means;
   a mass coupled to said support means by way of a resiliently deformable element;
   said resiliently deformable element comprising a means for permitting the mass to be deflected relative to said support means in response to centrifugal force during rotation of said support means;
   means for causing said mass to vibrate resonantly at a frequency determined by the stiffness of said resiliently deformable element;
   said resiliently deformable element and said support means comprising a means permitting said stiffness to vary with said deflection of said mass; and
   transducer means for, responsive to said frequency, for forming a roll rate signal, wherein said resiliently deformable element is positioned for contacting said support means said stiffness to vary with said deflection.

2. A sensor according to claim 1, including a support structure supporting said support means for rotation with respect to the support structure and drive motor means coupled to the support means for rotating said support means whereby, in use, the rotation of said support means comprises the sum of its rotation with respect to the support structure plus any rotation of said support structure.

3. A roll rate sensor for determining the roll rate of a body about a roll axis of the body, the sensor comprising:
 a rotary member, supported by the body, for rotation with respect to said body about said axis;
 drive motor means, coupled to said rotary member, for rotating the rotary member with respect to said body about said axis;
 a vibratory mass;
 resiliently deformable mounting means, coupling said mass to said rotary member, for permitting deflection of said mass under the influence of centrifugal force acting on the mass, said mounting means having a means for varying stiffness in relation to said deflection of said mass;
 means for causing the mass to vibrate at a resonant frequency, said resonant frequency dependent upon the deflection of the mass and hence upon said centrifugal force; and
 transducer means, responsive to said resonant frequency, for forming an electrical signal representative of the roll rate of said body.

4. A sensor according to claim 3, wherein the resiliently deformable mounting means comprises an elongate member having two ends, one end connected to said rotary member and another end connected to said mass, said rotary member including means defining a curved surface along at least a portion of said elongate member and for at least a portion of the elongate member to contact said curved surface and for said portion to progressively increase with increasing deflection of said mass.

5. A sensor according to claim 3, wherein the transducer means is fixed with respect to the body.

6. A sensor according to claim 3, wherein the rotary member is shaped for progressively contacting the resiliently deformable mounting means along the length of said resiliently deformable mounting means as mass deflection increases, thus progressively decreasing the length of the resiliently deformable mounting means that is free to vibrate and increasing the vibration frequency of the mass.

7. A roll-rate sensor for forming a signal representative of the rate of rotation of a body about a roll axis of the body, the sensor comprising:
 a drive motor supported by said body;
 a rotary member, coupled to the drive motor, for being rotated by said motor with respect to said body about said roll axis, said rotary member having a total rate of rotation comprising the algebraic sum of the rate of rotation of said rotary member with respect to said body and the rate of rotation of said body;
 a movable mass, connected to said rotary member by way of a resiliently deformable beam for moving outwardly away from said roll axis in response to centrifugal force acting on said mass as a result of said total rotation, outward movement of said mass being accompanied by bending of the beam and being resisted by a restoring force exerted by said beam;
 means for vibrating said movable mass at a resonant frequency dependent upon a free length of said beam;
 a contact member, fixed with respect to the rotary member, having portions defining a curved surface alongside said beam, such that said beam comes into progressively greater contact with said curved surface with a consequent change in said free length of said beam as said outward movement of the mass increases; and
 transducer means for sensing the vibration of said mass and for forming an electrical signal corresponding to said vibration.

8. A roll-rate sensor according to claim 7 wherein said contact member comprises a further beam wherein said curved surface comprises a substantially straight section bent to a bow-shape, said section having two ends fixed with respect to the rotary member to retain said bow-shape.

9. A roll-rate sensor according to claim 8, wherein said deformable beam, said mass and said further beam are defined by respective portions of a one-piece member made of silicon.

10. A roll-position sensor for making available a signal indicative of the roll-position of a body relative to a roll axis of that body, said roll position sensor comprising:
 a rotary member, supported by the body, for rotation with respect to said body about said axis;
 drive motor means, coupled to said rotary member, for rotating the rotary member with respect to said body about said axis;
 a vibratory mass;
 resiliently deformable mounting means, coupling said mass to said rotary member, for permitting deflection of said mass under the influence of centrifugal force acting on the mass, said mounting means having a means for varying stiffness in relation to said deflection of said mass;
 means for causing the mass to vibrate at a resonant frequency, said resonant frequency dependent upon the deflection of the mass and hence upon said centrifugal force;
 transducer means, responsive to said resonant frequency, for forming an electrical signal representative of the roll rate of said body; and
 calculating means, connected to said transducer means, for receiving reference data concerning said roll-position at one time instant and for subsequently updating said data by reference to said signal from said transducer means.

* * * * *